J. C. ERWOOD.
Cultivator.
No. 100,277. Patented March 1, 1870.
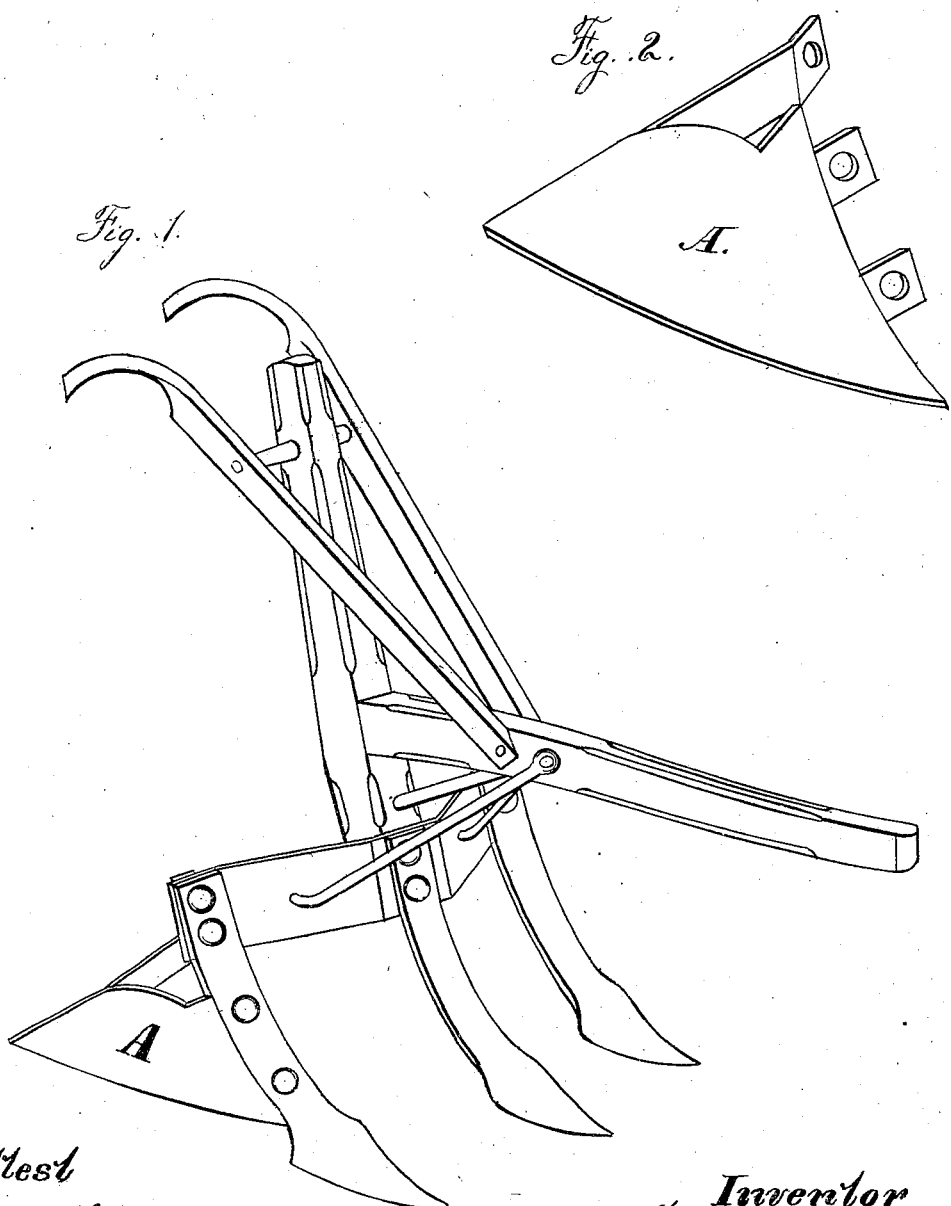
Attest
W. C. Stinback
John W. Hinds
Inventor
John C. Erwood
by his attys
A. M. Jonesete & Bro.

UNITED STATES PATENT OFFICE.

JOHN C. ERWOOD, OF VERNON, INDIANA.

IMPROVEMENT IN CORN-CULTIVATORS.

Specification forming part of Letters Patent No. 100,277, dated March 1, 1870.

*To all whom it may concern:*

Be it known that I, JOHN C. ERWOOD, of Vernon, in the county of Jennings and State of Indiana, have invented an Improved Corn-Cultivator; and I do hereby declare that the following is a full and exact description of the same, reference being had to the accompanying drawings, forming part of this specification—

Figure 1 being a perspective view of the cultivator; Fig. 2, a view of the adjustable mold-board.

The principal feature of novelty in this invention consists in supplying the cultivator with a mold-board adjustable in its attachment for "hilling up" the rows of corn.

Let Fig. 1 represent a cultivator constructed, substantially in the manner represented, with three teeth. To the tooth on the right side is secured by bolts or other equivalent device a mold-board, A. (Shown enlarged in Fig. 2.) This board is adjustable and can be removed at pleasure, so that the cultivator may be used in the ordinary way, which will be necessary in plowing the corn the first time.

In operation the cultivator is driven backward and forward between the same rows, once each way, so as to bring the mold-board to bear in hilling up the rows of corn on either side.

Having thus described my invention, what I claim as new, and desire to secure by Letters Patent, is—

The combination of an adjustable mold-board, A, with a triple-toothed cultivator, for the purpose and in the manner substantially as shown.

JOHN C. ERWOOD.

Witnesses:
HENRY CONNETT, Jr.,
W. C. STINEBACK.